(No Model.) 3 Sheets—Sheet 1.

J. P. PUTNAM.
Ventilating Gasalier.

No. 233,372. Patented Oct. 19, 1880.

Witnesses.
S. N. Piper
Wm W. Hunt

Inventor.
John Pickering Putnam.
by attorney.
R. H. Eddy (No Model.) 3 Sheets—Sheet 2.

J. P. PUTNAM.
Ventilating Gasalier.

No. 233,372. Patented Oct. 19, 1880.

Witnesses.
S. N. Piper
Wm W. Hunt

Inventor.
John Pickering Putnam
by attorney
R. H. Eddy

N. PETERS, PHOTO-LITHOGRAPHER, WASHINGTON, D. C.

(No Model.) 3 Sheets—Sheet 3.
J. P. PUTNAM.
Ventilating Gasalier.
No. 233,372. Patented Oct. 19, 1880.
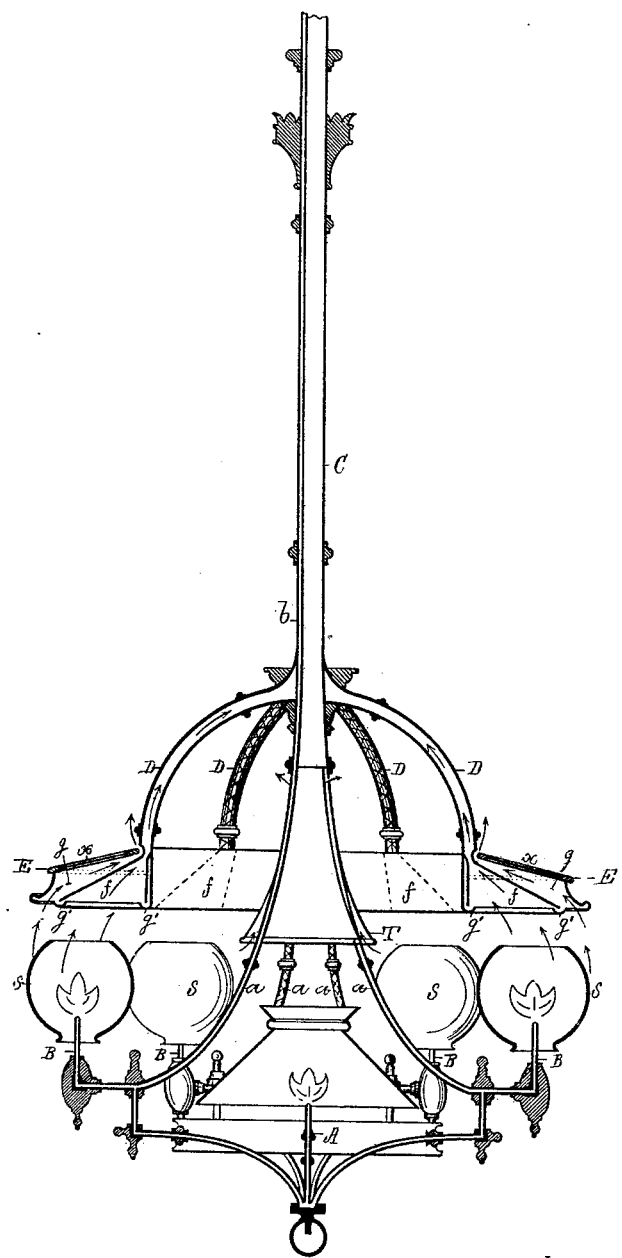

UNITED STATES PATENT OFFICE.

JOHN P. PUTNAM, OF BOSTON, MASSACHUSETTS.

VENTILATING-GASALIER.

SPECIFICATION forming part of Letters Patent No. 233,372, dated October 19, 1880.

Application filed July 19, 1880. (No model.)

*To all whom it may concern:*

Be it known that I, JOHN PICKERING PUTNAM, of Boston, of the county of Suffolk and State of Massachusetts, have invented a new and useful Improvement in Ventilating-Gasaliers; and I do hereby declare the same to be described in the following specification and represented in the accompanying drawings, of which—

Figure 1:
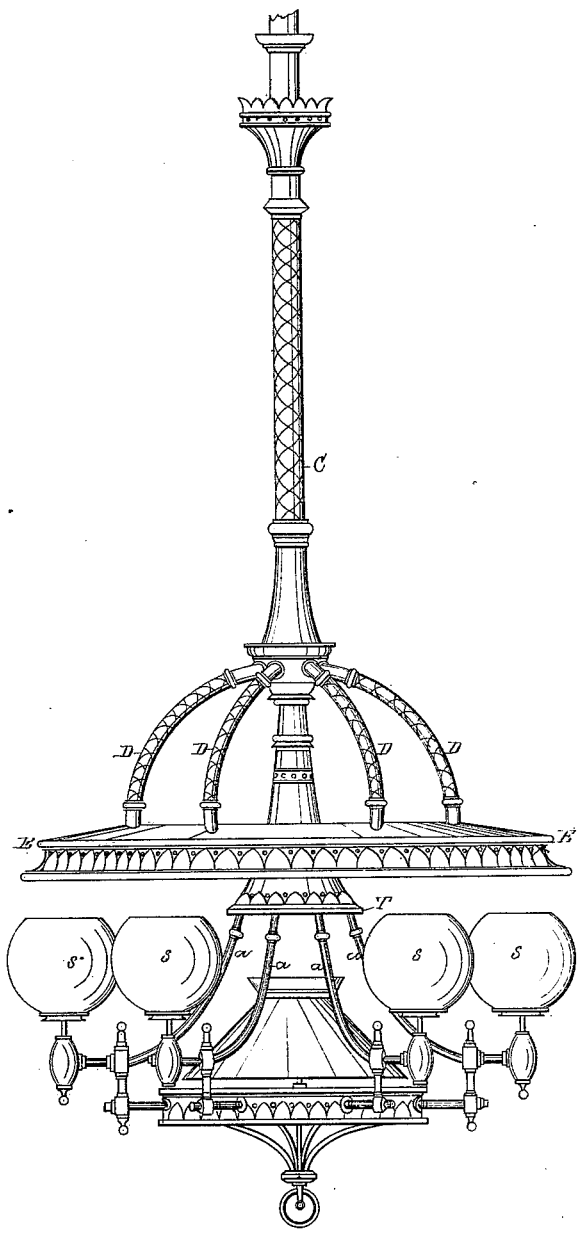

Figure 1 is a side elevation, and Fig. 2 a vertical section, of a gasalier embracing my invention, the nature of which is fully set forth in the claims hereinafter presented. Fig. 3 represents a sectional view of a gasalier with a modification, as hereinafter described. One object of it is the production of a ventilating-gasalier by which the volatile products of combustion arising from the flames of the burners may be carried off with the least possible expenditure of the heated air of the apartment containing such gasalier.

The drawings represent a gasalier having a central burner, A, and a surrounding series of burners, B, all by means of suitable branch pipes $a$ leading from them, being supported in place and communicating with a main duct or pipe, $b$, which extends down within a ventilating-conduit, C, having at its lower part a mouth-piece or trumpet, T, and a series of branch pipes, D D, arranged as represented. The said branch pipes serve to support a ventilating annular bell or mouth-piece, E, out of the upper part of which each of said pipes opens in manner as shown, the said mouth-piece or bell being arranged directly over the series of outer burners, or their glass shades or globes $s$, as represented. This auxiliary mouth-piece or bell may be an annular inverted trough. If desirable, it may have radial partitions in it, dividing its interior into separate spaces or chambers, each of which, open at bottom, may communicate with one of the bell-supporting branch pipes, or the bell or mouth-piece may be composed of a series of tapering mouths or trumpets suitably connected together, and opening, respectively, into the supporting branch pipes.

Figure 2:
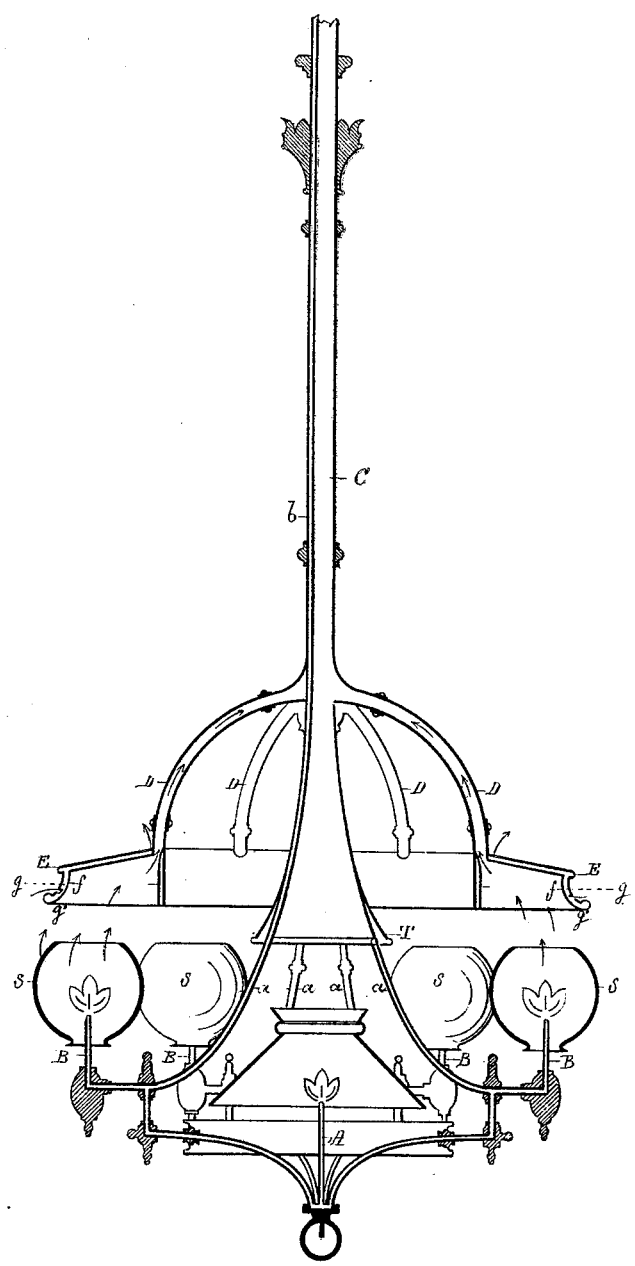

In order to protect each bell or trumpet from the heat and smoke of its burner or burners—that is, from being injured thereby—I construct such bell or provide it on its inner surface with an internal lining, $f$, arranged with an air-conducting space, $g$, between it and the surface next adjacent to it, the same being as shown in Fig. 2, and so that air may flow freely into the lower part of said space and up through the space and out of the upper part thereof. The bell may be made either wholly or partially of glass.

Furthermore, I provide the ventilating-bell, at its lower edge, with a trough, $g'$, extending about such, it being to intercept any condensed vapor that may run down the inner surface of the bell and be liable to drop upon and soil the glass shades or objects under the bell.

Furthermore, I would remark that I sometimes modify the internal lining, $f$, by resolving it into metallic cones or mouth-pieces to the branch pipes D, each of such mouth-pieces being placed over a burner and within the annular bell, in which case the upper portion of the said bell I usually construct in whole or in part of glass, in order to allow light from the burner to pass up through the glass part or parts. Such a construction I have represented in Fig. 3, in which the annular bell is shown at E, its branch tubes at D, and the metallic cones or mouth-pieces at $f$, and the air-conducting space at $g'$, the glass part being represented at $x\ x$.

I am aware that prior to my invention it has been customary to make a gasalier with a series of ventilating-tubes, a mouth-piece to each of them, and an air-receiver, the latter being located above the mouth-pieces, at the upper parts of the tubes, and provided with apertures or inducts to receive air from an apartment in which the gasalier may be placed, all of which differs from my invention embracing the annular receiving-bell, by which I am enabled to dispense with the aforesaid receiver and the separate mouth-pieces and make the said bell answer all the purposes thereof, besides being advantageous in other respects. With the annular receiving-bell the branch pipes need not extend directly over the burners, and, furthermore, the annular bell admits of a variation in the number of burners without at the same time requiring a like variation in the number of branch tubes. In a gasalier so made the smoke and waste gases arising from the flames of the burners will pass into the bell or bells or receiving-trumpets, and from thence will escape into the main supporting educt or pipe, from whence they may be led by a suitable conduit into a chimney.

What I claim as my invention is as follows, viz:

1. A gasalier composed of the ventilating-pipe, its series of tubular branches, the smoke-receiving annular bell, and series of burners and gas-induction pipe, all combined and arranged substantially as set forth.

2. The gasalier composed of the ventilating-pipe, its terminal trumpet or receiving annular mouth, the series of branch-eduction pipes and their receiving-bell, and the central and surrounding burners, with their branch pipes and induct, all arranged and combined substantially as specified.

3. The gasalier-bell provided with the protective lining arranged within it, and with a ventilating-space between such lining and the bell, all substantially as set forth.

4. The gasalier-bell provided with the condensed-moisture-receiving trough, arranged substantially as specified.

5. The gasalier-bell made in whole or in part of glass, and provided with the internal series of conic mouth-pieces, $f$, arranged in it, and opening into the supporting ducts or tubes D, as described, whereby light from the flames of the burners may pass up through the upper portion of the bell, and the smoke and waste gases from the burners be caused to escape through the cones and branch pipes, all being substantially as set forth.

JNO. PICKERING PUTNAM.

Witnesses:
R. H. EDDY,
S. N. PIPER.